C. GERSTEN.
Lantern.
No. 2,766.
Reissued Sept. 17, 1867.
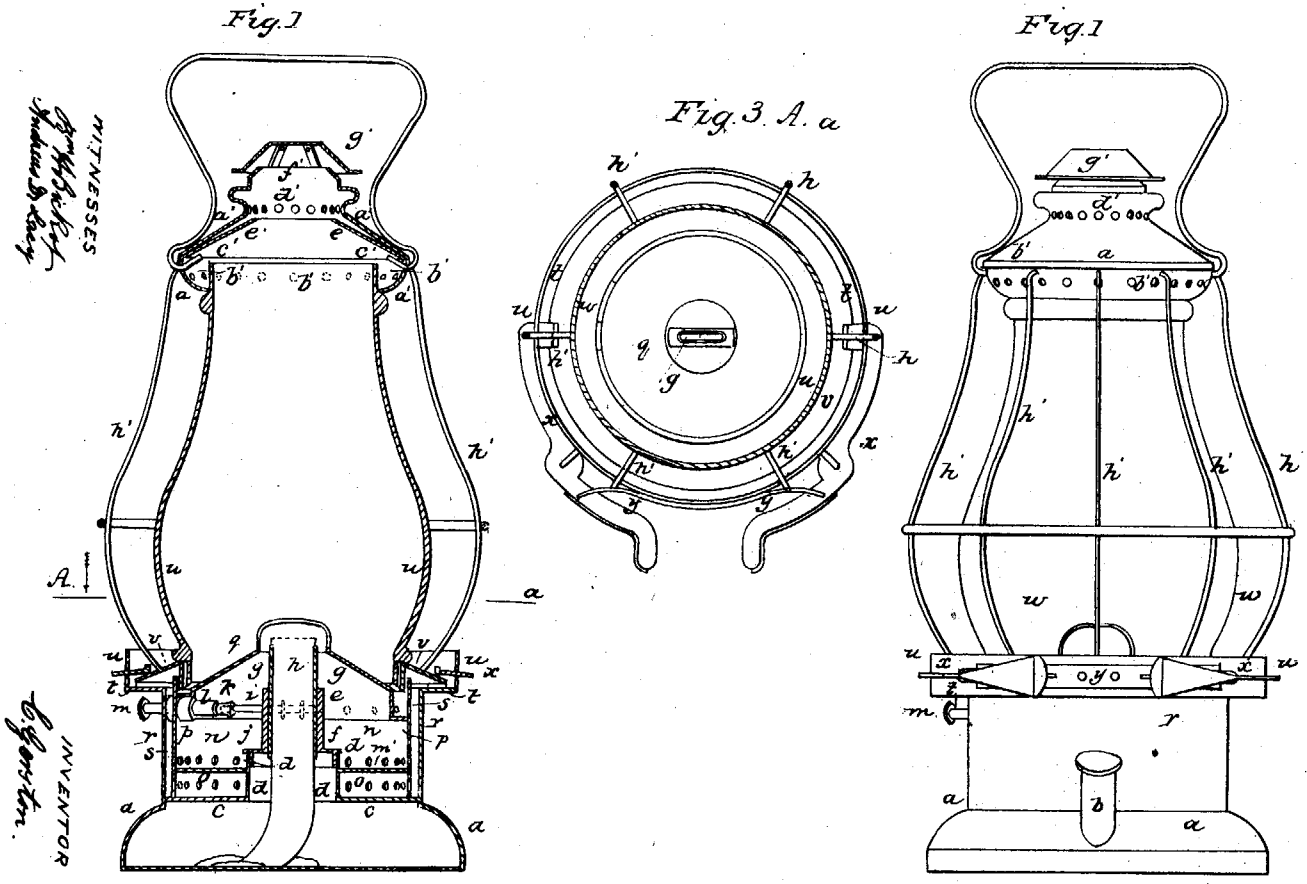
N. PETERS, Photo-Lithographer, Washington, D. C.

United States Patent Office.

WILLIAM WESTLAKE AND JAMES F. DANE, OF NEW YORK, N. Y.
ASSIGNEES OF CONRAD GERSTEN.

*Letters Patent No.* 22,723, *dated January* 25, 1859; *reissue No.* 2,766, *dated September* 17, 1867.

IMPROVEMENT IN LANTERNS.

The Schedule referred to in these Letters Patent and making part of the same.

TO ALL WHOM IT MAY CONCERN:

Be it known that, CONRAD GERSTEN, of Brooklyn, in the county of Kings, and State of New York, invented certain new and useful Improvements in Lanterns; and we do hereby declare that the following is a full, clear, and exact description thereof, reference being had to the accompanying drawings, making part of this specification, in which—

Figure 1 is a side elevation of the lantern.

Figure 2, a vertical central section; and

Figure 3, a horizontal section, taken at the line A of fig. 2.

Like letters indicate the same parts in all of the figures.

The lanterns which have heretofore been made have had no provision for regulating the wicks from the outside, which has proved a source of great inconvenience, as the only way provided for regulating them was by taking the burner out of the lantern, and, in consequence, they could not be adjusted in windy weather without danger of extinguishing the flame. In burning coal oils it is necessary to occasionally regulate or adjust the wick, as the flame, which burns to a proper height when first lighted, will smoke when the lantern becomes heated, and it is exceedingly difficult to adjust the wick to the proper position when the regulator is entirely inside of the lantern. By locating the end of the spindle outside of the case, it can be done so as to regulate the wick to all of the conditions of the lantern as readily as though the flame were not surrounded by a lantern-case.

The object of said invention is to avoid and overcome these defects, and the nature of said invention consists in controlling the wick from the outside of the lantern by a spindle, extending from the roller that adjusts the wick, through the casing, to the outside; in providing it with a button or other suitable means for operating the roller located outside of the casing, and in the several combinations hereinafter set forth and claimed as new.

To enable others skilled in the art to make and use said invention, we will proceed to describe its construction and operation.

In the accompanying drawings, *a* represents the pedestal of a lantern, which is hollow, to form a reservoir to contain the oil, and provided with a tube, *b*, outside, and a cup-screw, through which the oil is to be supplied. The upper plate *c* of this oil-reservoir has a central hole, provided with a tube, *d*, which extends up to the required height, and to the upper end of which is fitted the burner *e*, of the usual construction for lanterns. In the form shown it has a cup, *f*, fitted to the tube *d*, and is provided with a flat-wick tube, *g*, in which the upper end of a flat wick, *h*, slides, the main body of the wick being immersed in the oil. This wick is moved up or down by the toothed wheels on the spindle *i* attached to the burner. The end of this spindle is square, to fit in the extension or other spindle *k*, which turns in a tubular box, *l*, and passes through the surrounding casing, and is provided with a thumb and finger-wheel or button, *m*, outside of the casing.

After the wick-tube has been put in place, by simply turning the thumb-and-finger wheel outside, the elevation of the wick can be readily adjusted. A suitable globe, with metallic guards and the necessary mountings to form a complete lantern, is to be added to the base, in which the extended spindle or wick-ratchet is located.

Having thus fully described that part of said invention which is embraced in this subdivision, what we claim as new, and as the invention of said CONRAD GERSTEN, and desire to secure by Letters Patent, is—

1. Extending the spindle for operating the wick-ratchet through the outer casing of a lantern, substantially as and for the purposes specified.

2. A spindle extending through the outer casing of a lantern, so combined with a toothed wheel or rotating device and a wick-tube, as that the wick may be adjusted without removing or changing the lamp.

3. The spindle *k i*, button *m*, and tube *l*, in combination with the ratchet and wick-tube of a lantern, substantially as specified.

WILLIAM WESTLAKE,
JAMES F. DANE.

Witnesses:
L. L. BOND,
A. T. SANGSTON.